US008278001B2

(12) United States Patent
Jung et al.

(10) Patent No.: US 8,278,001 B2
(45) Date of Patent: Oct. 2, 2012

(54) LOW-POROSITY ANODE DIFFUSION MEDIA FOR HIGH CONCENTRATION DIRECT METHANOL FUEL CELLS AND METHOD OF MAKING

(75) Inventors: Seung Hun Jung, State College, PA (US); Chao-Yang Wang, State College, PA (US); Takashi Akiyama, Osaka (JP)

(73) Assignees: Panasonic Corporation, Osaka (JP); The Penn State Research Foundation, University Park, PA (US)

( * ) Notice: Subject to any disclaimer, the term of this patent is extended or adjusted under 35 U.S.C. 154(b) by 248 days.

(21) Appl. No.: 12/711,817

(22) Filed: Feb. 24, 2010

(65) Prior Publication Data

US 2010/0221625 A1    Sep. 2, 2010

Related U.S. Application Data

(63) Continuation-in-part of application No. 12/071,155, filed on Feb. 15, 2008.

(51) Int. Cl.
*H01M 4/26* (2006.01)
*H01M 8/00* (2006.01)
*H01M 4/02* (2006.01)
*H01M 8/10* (2006.01)

(52) U.S. Cl. ........ 429/480; 429/400; 429/535; 429/484; 429/523

(58) Field of Classification Search ................ 429/428, 429/443, 447–48, 452, 545, 456, 463, 465, 429/467–469, 471, 479–483, 494, 507, 509, 429/512–513, 523, 530, 534–535, 400, 484
See application file for complete search history.

(56) References Cited

U.S. PATENT DOCUMENTS

| | | | |
|---|---|---|---|
| 2003/0022054 A1* | 1/2003 | Marsacq et al. | 429/40 |
| 2004/0121208 A1 | 6/2004 | James et al. | |
| 2005/0084742 A1 | 4/2005 | Angelopoulos et al. | |
| 2007/0154779 A1 | 7/2007 | Ko et al. | |
| 2009/0092882 A1* | 4/2009 | Kjeang et al. | 429/34 |

FOREIGN PATENT DOCUMENTS

| | | |
|---|---|---|
| DE | 10 2006 048 612 A1 | 4/2007 |
| EP | 1 538 689 A2 | 6/2005 |
| JP | 2007-234589 | 9/2007 |
| WO | WO 2007/111201 A1 | 10/2007 |

OTHER PUBLICATIONS

United States Office Action, issued in U.S. Appl. No. 12/071,155, dated Nov. 2, 2011.
Thomas et al. "Direct methanol fuel cells: progress in cell performance and cathode research" Electrochimica Acta, vol. 47, 2002, pp. 3741-3748.
Abdelkareem et al. "DMFC employing a porous plate for an efficient operation at high methanol concentrations", Journal of Power Sources, vol. 162, 2006, Elsevier B.V., pp. 114-123.
Lim et al. "Effects of hydrophobic polymer content in GCL on power performance of PEM fuel cell", Electrochimica Acta, vol. 49, 2004, pp. 4149-4156.
Deluca et al., "Polymer Electrolyte Membranes for the Direct Methanol Fuel Cell: A Review", Wiley Interscience, Journal of Polymer Science: Part B: Polymer Physics, vol. 44, pp. 2201-2225, 2006.
Neburchilov et al. "A Review of Polymer Electrolyte Membranes for Direct Methanol Fuel Cells", Journal of Power Sources, 63 pages, Mar. 15, 2007.
International Search Report and Written opinion of the International Searching Authority, issued in International Application No. PCT/US2009/033926, dated May 8, 2009.
F. Colmati., et al., "Effect of operational parameters of mini-direct methanol fuel cells operating at ambient temperature", Journal of Applied Electrochemistry, 2006, pp. 17-23, vol. 36., Springer.
Wang., et al., "Two-phase transport and the role of micro-porous layer in polymer electrolyte fuel cells", Electrochemica Acta., 2004, pp. 4359-4369, vol. 49, Elsevier.
Nguyen, T.V., et al., "A Two-Dimensional, Two-Phase, Multicomponent, Transient Model for the Cathode of a Proton Exchange Membrane Fuel Cell Using Conventional Gas Distributors", Journal of the Electrochemical Society, 2001, A1324-1335, vol. 148 No. 12, The Electrochemical Society, Inc.
Wang, C.Y., et al., "Development of high-power electrodes for a liquid-feed direct methanol fuel cell", Journal of Power Sources, 2003, pp. 145-150, vol. 113, Elsevier Science B.V.
Wang, C.Y., et al., "Liquid Water Transport in Gas Diffusion Layer of Polymer Electrolyte Fuel Cells", Journal of the Electrochemical Society, 2004, pp. A399-A406, vol. 151, ECS.

* cited by examiner

*Primary Examiner* — Barbara Gilliam
*Assistant Examiner* — Claire L Roe
(74) *Attorney, Agent, or Firm* — McDermott Will & Emery LLP (57) ABSTRACT

A direct oxidation fuel cell (DOFC) having a liquid fuel and an anode electrode configured to generate power. The anode electrode includes a gas diffusion layer (GDL) and a microporous layer, such that a decrease in the porosity of the GDL achieves an increase in the power density of the DOFC.

10 Claims, 7 Drawing Sheets

(a) Case 1, T=65°C, 6M, $\xi_a/\xi_c = 1.35/3$ @250mA/cm$^2$
    $E_{ave, 2h} = 0.337V$, P = 84 mW/cm$^2$
(b) Case 2, T=65°C, 6M, $\xi_a/\xi_c = 1.35/3$ @250mA/cm$^2$
    $E_{ave, 2h} = 0.333V$, P = 83 mW/cm$^2$
(c) Case 2, T=65°C, 6M, $\xi_a/\xi_c = 1.77/3$ @300mA/cm$^2$
    $E_{ave, 2h} = 0.324V$, P = 97 mW/cm$^2$
(d) Case 2, T=60°C, 8M, $\xi_a/\xi_c = 1.93/3$ @300mA/cm$^2$
    $E_{ave, 2h} = 0.293V$, P = 88 mW/cm$^2$

LOW-POROSITY ANODE DIFFUSION MEDIA FOR HIGH CONCENTRATION DIRECT METHANOL FUEL CELLS AND METHOD OF MAKING

FIELD OF THE INVENTION

This application is a continuation in part U.S. patent application Ser. No. 12/071,155 filed Feb. 15, 2008, the entire contents of each of which are hereby incorporated by reference.

The present disclosure relates generally to fuel cells, fuel cell systems, and electrodes/electrode assemblies for the same. In particular, the present disclosure relates to electrodes with improved gas diffusion media, suitable for direct oxidation fuel cells (hereinafter "DOFC"), such as direct methanol fuel cells (hereinafter "DMFC"), and their components. More specifically, the present disclosure relates to gas diffusion media configured to provide improved power density.

BACKGROUND OF THE DISCLOSURE

A DOFC is an electrochemical device that generates electricity from electrochemical oxidation of a liquid fuel. DOFC's do not require a preliminary fuel processing stage; hence, they offer considerable weight and space advantages over indirect fuel cells, i.e., cells requiring preliminary fuel processing. Liquid fuels of interest for use in DOFC's include methanol, formic acid, dimethyl ether, etc., and their aqueous solutions. The oxidant may be substantially pure oxygen or a dilute stream of oxygen, such as that in air. Significant advantages of employing a DOFC in portable and mobile applications (e.g., notebook computers, mobile phones, personal data assistants, etc.) include easy storage/handling and high energy density of the liquid fuel.

One example of a DOFC system is a direct methanol fuel cell, (DMFC). A DMFC generally employs a membrane-electrode assembly (hereinafter "MEA") having an anode, a cathode, and a proton-conducting membrane electrolyte positioned therebetween. In the MEA, a catalyst layer is usually supported on the gas diffusion layer (GDL) that is made of either a woven carbon cloth or a non-woven carbon. The micro porous layers (MPL), is placed between the catalyst layer and GDL, is intended to provide wicking of liquid water into the GDL, minimize electric contact resistance with the adjacent catalyst layer, and furthermore prevent the catalyst layer from leaking into the GDL, thereby increasing the catalyst utilization and reducing the tendency of electrode flooding.

A typical example of a membrane electrolyte is one composed of a perfluorosulfonic acid-tetrafluorethylene copolymer, such as NAFION® (NAFION® is a registered trademark of E.I. Dupont de Nemours and Company). In a DOFC, an alcohol/water solution is directly supplied to the anode as the fuel and air is supplied to the cathode as the oxidant. At the anode, the alcohol, such as methanol reacts with water in the presence of a catalyst, typically a Pt or Ru metal-based catalyst, to produce carbon dioxide, $H^+$ ions (protons), and electrons. The electrochemical reaction is shown as equation (1) below:

$$CH_3OH + H_2O \rightarrow CO_2 + 6H^+ + 6e^- \qquad (1)$$

During operation of the DOFC, the protons migrate to the cathode through the proton-conducting membrane electrolyte, which is non-conductive to electrons. The electrons travel to the cathode through an external circuit for delivery of electrical power to a load device. At the cathode, the protons, electrons, and oxygen molecules, typically derived from air, are combined to form water. The electrochemical reaction is given in equation (2) below:

$$3/2 O_2 + 6H^+ + 6e^- \rightarrow 3H_2O \qquad (2)$$

Electrochemical reactions (1) and (2) form an overall cell reaction as shown in equation (3) below:

$$CH_3OH + 3/2 O_2 \rightarrow CO_2 + 2H_2O \qquad (3)$$

One drawback of a conventional DOFC is that the alcohol, such as methanol partly permeates the membrane electrolyte from the anode to the cathode, such permeated methanol being termed "crossover methanol". The crossover methanol chemically and/or electrochemically reacts with oxygen at the cathode, causing a reduction in fuel utilization efficiency and cathode potential, with a corresponding reduction in power generation of the fuel cell. It is thus conventional for DOFC systems, to use excessively dilute (3-6% by vol.) alcohol solutions for the anode reaction in order to limit crossover and its detrimental consequences. However, the problem with such a DOFC system is that it requires a significant amount of water to be carried in a portable system, thus diminishing the system energy density.

The ability to use highly concentrated fuel is desirable for portable power sources, particularly since DOFC technology is currently competing with advanced batteries, such as those based upon lithium-ion technology. However, even if the fuel cartridge with highly concentrated fuel (e.g., pure or "neat" methanol) carries little to no water, the anodic reaction, i.e., equation (1), still requires one water molecule for each methanol molecule for complete electro-oxidation. Simultaneously, water is produced at the cathode via reduction of oxygen, i.e., equation (2). Therefore, in order to take full advantage of a fuel cell employing highly concentrated fuel, it is considered desirable to: (a) maintain a net water balance in the cell where the total water loss from the cell (mainly through the cathode) preferably does not exceed the net production of water (i.e., two water molecules per each methanol molecule consumed according to equation (3)), and (b) transport some of the produced water from the cathode to anode.

Two approaches have been developed to meet the above-mentioned goals in order to directly use concentrated fuel. A first approach is an active water condensing and pumping system to recover cathode water vapor and return it to the anode (U.S. Pat. No. 5,599,638). While this method achieves the goal of carrying concentrated (and even neat) methanol in the fuel cartridge, it suffers from a significant increase in system volume and parasitic power loss due to the need for a bulky condenser and its cooling/pumping accessories.

The second approach is a passive water return technique in which hydraulic pressure at the cathode is generated by including a highly hydrophobic microporous layer (hereinafter "MPL") in the cathode, and this pressure is utilized for driving water from the cathode to the anode through a thin membrane (Ren et al. and Pasaogullari & Wang, *J. Electrochem. Soc.*, pp A399-A406, March 2004). While this passive approach is efficient and does not incur parasitic power loss, the amount of water returned, and hence the concentration of methanol fuel, depends strongly on the cell temperature and power density.

Presently, direct use of neat methanol is demonstrated at or below 40° C. and at low power density (less than 30 mW/cm²). Considerably less concentrated alcohol fuel, such as methanol is utilized in high power density (e.g., 60 mW/cm²) systems at elevated temperatures, such as 60° C. In addition, the requirement for thin membranes in this method sacrifices fuel efficiency and operating cell voltage, thus resulting in lower total energy efficiency.

In order to utilize highly concentrated fuel with DOFC systems, such as DMFC systems described above, it is preferable to reduce the oxidant stoichiometry ratio, i.e., flow of oxidant (air) to the cathode for reaction according to equation (2) above. In turn, operation of the cathode must be optimized so that liquid product(s), e.g., water, formed on or in the vicinity of the cathode can be removed therefrom without resulting in substantial flooding of the cathode.

Accordingly, there is a prevailing need for DOFC/DMFC systems that maintain a balance of water in the fuel cell and return a sufficient amount of water from the cathode to the anode when operated with highly concentrated fuel and low oxidant stoichiometry ratio, i.e., less than about 8. There is an additional need for DOFC/DMFC systems that operate with highly concentrated fuel, including neat methanol, and minimize the need for external water supplies or condensation of electrochemically produced water.

Therefore, it is desirable to reduce methanol crossover from the anode to the cathode. There are several methods to reduce methanol crossover: (1) develop alternative proton conducting membranes with low methanol permeability, (see, N. W. Deluca and Y. A. Elabd, Polymer electrolyte membranes for the direct methanol fuel cell: A review, *Journal of Polymer Science: Part B: Polymer Physics*, 44, pp. 2201-2225, 2006 and V. Neburchilov, J. Martin, H. J. Wang, J. J. Zhang, A Review of Polymer Electrolyte Membranes for Direct Methanol Fuel Cells, *Journal of Power Sources*, 169, pp. 221-238, 2007); (2) modify the existing membrane like NAFION® by making it a composite with inorganic and organic materials, or by executing the membrane surface modification, (see Delucca et al., and Neburchilov et al.); (3) control the mass transport in the anode through a porous carbon plate. (See M. A. Abdelkareem and N. Nakagawa, DMFC employing a porous plate for an efficient operation at high methanol concentrations, *Journal of Power Sources*, 162, pp. 114-123, 2006).

However, the above-mentioned methods have certain disadvantages. In Method (1), low proton conductivity of alternative polymer electrolyte membranes and low compatibility/adhesion with NAFION®-bonded electrodes limit the attainment of high power density. In Method (2), modification of NAFION® membrane may lead to the decrease of proton conductivity and stability. In Method (3), the addition of porous carbon plate increases the thickness of each unit cell and hence increases the stack volume; and it likely increases the manufacturing cost of a DMFC system.

In view of the foregoing, there exists a need for improved DOFC/DMFC systems including an anode diffusion medium, more commonly known gas diffusion layer (GDL), which facilitates a reduction of methanol crossover.

SUMMARY OF THE DISCLOSURE

An advantage of the present disclosure is a fuel cell having reduced crossover of liquid fuel from one electrode to another and in particular a fuel cell having a reduced alcohol crossover.

Embodiments of the disclosure include a direct methanol cell having an anode diffusion medium with a porosity to minimize alcohol crossover and increase power density.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The various features and advantages of the present disclosure will become more apparent and facilitated by reference to the accompanying drawings, provided for purposes of illustration only and not to limit the scope of the invention, wherein the same reference numerals are employed throughout for designating like features and the various features are not necessarily drawn to scale but rather are drawn as to best illustrate the pertinent features.

DETAILED DESCRIPTION OF THE DISCLOSURE

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

The crossover of a fuel in a direct oxidation fuel cell can depend on several factors. For example, alcohol crossover depends on a number of factors, such as alcohol concentration fed into the anode, operating temperature, methanol permeability through anode diffusion media, thickness of anode diffusion media, and alcohol permeability through the membrane. In one aspect of the present disclosure, alcohol crossover is reduced via the control of the mass permeability through the anode diffusion media. The alcohol permeation flux through the anode diffusion media depends on the effective alcohol diffusivity and the feed alcohol concentration, where the effective alcohol diffusivity is a function of porosity and tortuosity of anode diffusion media, as shown in Eq. (1):

$$D^{\mathit{eff}} = \epsilon^n D \qquad (1)$$

where $D^{\mathit{eff}}$ is the effective alcohol diffusivity, $\epsilon$ the porosity of anode diffusion media, D the alcohol molecular diffusivity, and n the Bruggmann factor to account for the tortuosity effect. In general, an anode diffusion media reduces the alcohol transport from the feed to the anode catalyst layer, thereby limiting alcohol crossover. Typically, the GDL of a DOFC is about 78% porous. Hence, as used herein, a diffusion media (also described herein as a diffusion layer or GDL) with a reduced or low porosity is one that is less than 78% porous.

In an embodiment of the disclosure the porosity of the GDL less than about 10% for example less than about 1%. In a preferred embodiment of the disclosure, the porosity of the GDL is between 0.70 to 0.050%, for example 0.50 to 0.10%.

In an embodiment of the disclosure, the porosity of the diffusion medium such as the anode diffusion media is associated with operating temperature.

In another embodiment of the disclosure, the porosity of the diffusion medium such as the anode diffusion media is associated with current density. Another embodiment of the disclosure is a method of making a direct oxidation fuel cell (DOFC) comprising configuring an anode electrode comprising a gas diffusion layer (GDL) and a microporous layer (MPL). The porosity of the GDL is adjusted for example, by adjusting the fluorinated polymer content of the GDL, so that the porosity corresponds to a user selected operating temperature of the DOFC and/or the current density of the DOFC, thereby increasing the power density of the DOFC.

For example, an embodiment of the disclosure is a method of making a direct oxidation fuel cell (DOFC) which comprises configuring an anode electrode comprising a gas diffusion layer (GDL) loaded with at least one polymer and a microporous layer (MPL), selecting at least one of: a operating temperature of the DOFC and a current density of the DOFC, and adjusting the porosity of the GDL based on the operating temperature of the DOFC or the current density of the DOFC by adjusting a fluorinated polymer content of the GDL, to achieve a porosity of the GDL such that it increases the power density of the DOFC.

There are several ways to prepare an anode diffusion media having a porosity for use in fuel cells all without departing form the scope of the present disclosure. For example, the low porosity anode diffusion media can be obtained, without limitation, by: filling currently available carbon paper or carbon cloth GDL with polymers such as polytetrafluorethylene (PTFE), increase the thickness of the mode of diffusion media using other diffusion media inherently of low porosity, such as porous graphite, and using metal diffusion media with a controlled porosity.

Another embodiment of the disclosure, is a method of operating a direct oxidation fuel cell (DMFC) system, comprising steps of:
(a) providing at least one fuel cell assembly including a cathode and an anode with an electrolyte positioned therebetween, the anode comprising a gas diffusion layer (GDL) including a microporous layer, the microporous layer comprising an electrically conductive material and a fluoropolymer, loading of the fluoropolymer in the microporous layer being in the range from about 10 to about 70 wt %;
b) supplying a concentrated solution of a liquid fuel and water to said anode;
c) operating the at least one fuel cell assembly at a temperature of at least 65° C. and a current density of less than 275 mA/cm² and;
d) operating the at least one fuel cell assembly with low methanol cross-over and high power density.

Figure 1:
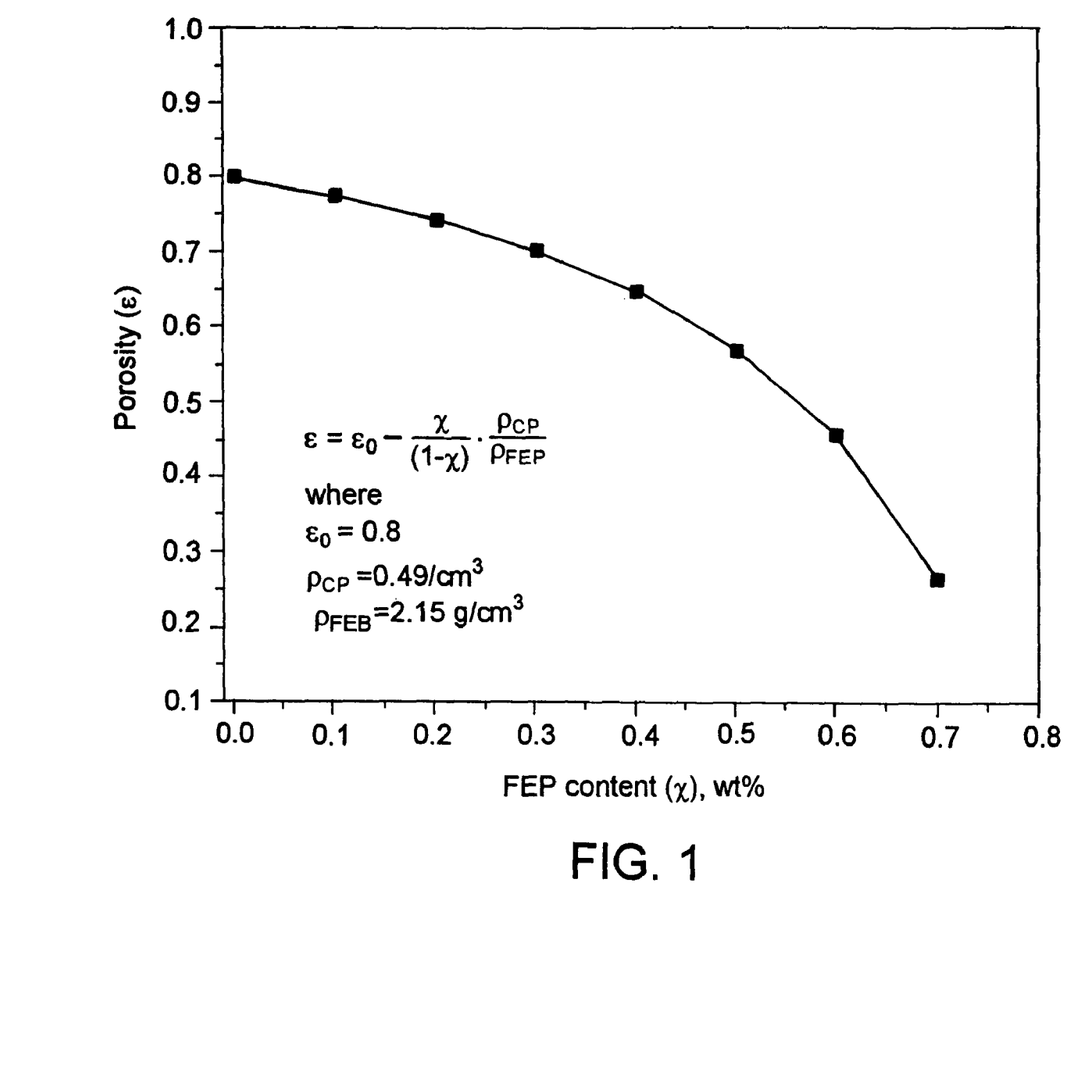
FIG. 1 is a graph showing the relationship between the porosity of FEP treated wet-proofed carbon paper and the FEP content.

In this disclosure, carbon paper diffusion medium is used as an example to show how using a low porosity anode diffusion media can significantly reduce alcohol crossover through the membrane. These methods and concepts can also be applied to other types of anode diffusion media. For example, an anode diffusion media with varying porosity can be prepared by treating carbon paper with different loading of fluorinated polymers. Fluorinated polymers useful for such treatment include, for example fluorinated ethylene propylene (FEP-60 from Electrochem. Inc). The porosity of the treated carbon paper depends on the weight fraction of the treated transparent exopolymer particles (TEP) in the carbon paper according to the following equation, $$\varepsilon\% = \varepsilon_0\% - \frac{\chi}{(1-\chi)} \cdot \frac{\rho_{CP}}{\rho_{FEP}} \qquad (2)$$

where $\epsilon$ is the porosity of the wet-proofed treated carbon paper, $\epsilon_0$ is the porosity of the untreated carbon paper, $\chi$ is the weight fraction of TEP in the carbon paper, $\rho_{CP}$ is the density of the carbon paper, and $\rho_{FEP}$ is the density of the dry FEP. FIG. 1 shows the relationship between the porosity of wet-proofed treated Toray TGPH-90 carbon paper and the weight fraction of dry FEP.

FIG. 1 shows that the high loading of FEP filled into carbon paper reduces the porosity of the carbon paper. The porosity of 10 wt %, 30 wt %, 50 wt % and 70 wt % wet-proofed Toray TGPH-90 carbon papers are 0.78%, 0.70%, 0.57% and 0.27% respectively. In this disclosure, two methods are described to reduce methanol permeability through GDL: one is to increase the thickness of anode diffusion media, and another one is to reduce the pore size/porosity of anode diffusion media. In case 1, two pieces of 30 wt % wet-proofed TGPH-90 Toray carbon paper is used as gas diffusion layer (GDL).

In case 2, one piece of 50 wt % wet-proofed TGPH-90 Toray carbon paper is used. In case 3, one piece of 70 wt % wet-proofed TGPH-90 Toray carbon paper is used. In the case 2 and case 3, the high loading of treatment agents is used to reduce the porosity of the GDL. As a result, a large resistance to methanol transport is created in the GDL.

The GDL in the base case is 10 wt % wet-proofed TGPH-90 Toray carbon paper, which is optimal for the DMFC fed with 1 molar (M) or 2M methanol solution due to the balance between sufficient mass transport of methanol through the anode diffusion media and reasonable methanol crossover.

The carbon papers were made hydrophobic by treating with fluorinated ethylene propylene polymer (FEP). For example, the carbon paper was slowly dipped into a 20 wt % FEP suspension, and then dried at 80° C. in the oven. The procedure was repeated until the desired loading of the FEP (10 wt %, 30 wt %, 50 wt % and 70 wt %) was achieved. The FEP-impregnated carbon paper was heat-treated at 270° C. for 10 min and sintered at 340° C. for 30 min. A paste for making desirable micro porous layers (MPL) was made by mixing carbon powder (for example, Vulcan XC-72R) and 60 wt % PTFE suspension, iso-propanol and de-ionized water. The paste was cast onto the surface of carbon paper to form micro porous layer. The coated carbon paper was dried at 100° C. for 1 h and sintered at 360° C. for 30 min. Details of MEA fabrication procedure are similar to that described in previous patents and/or publications, (see U.S. patent application Ser. No. 11/655,867), except for the 30 wt %, 50 wt % and 70 wt % wet-proofed carbon paper used as GDL.

Figure 2:
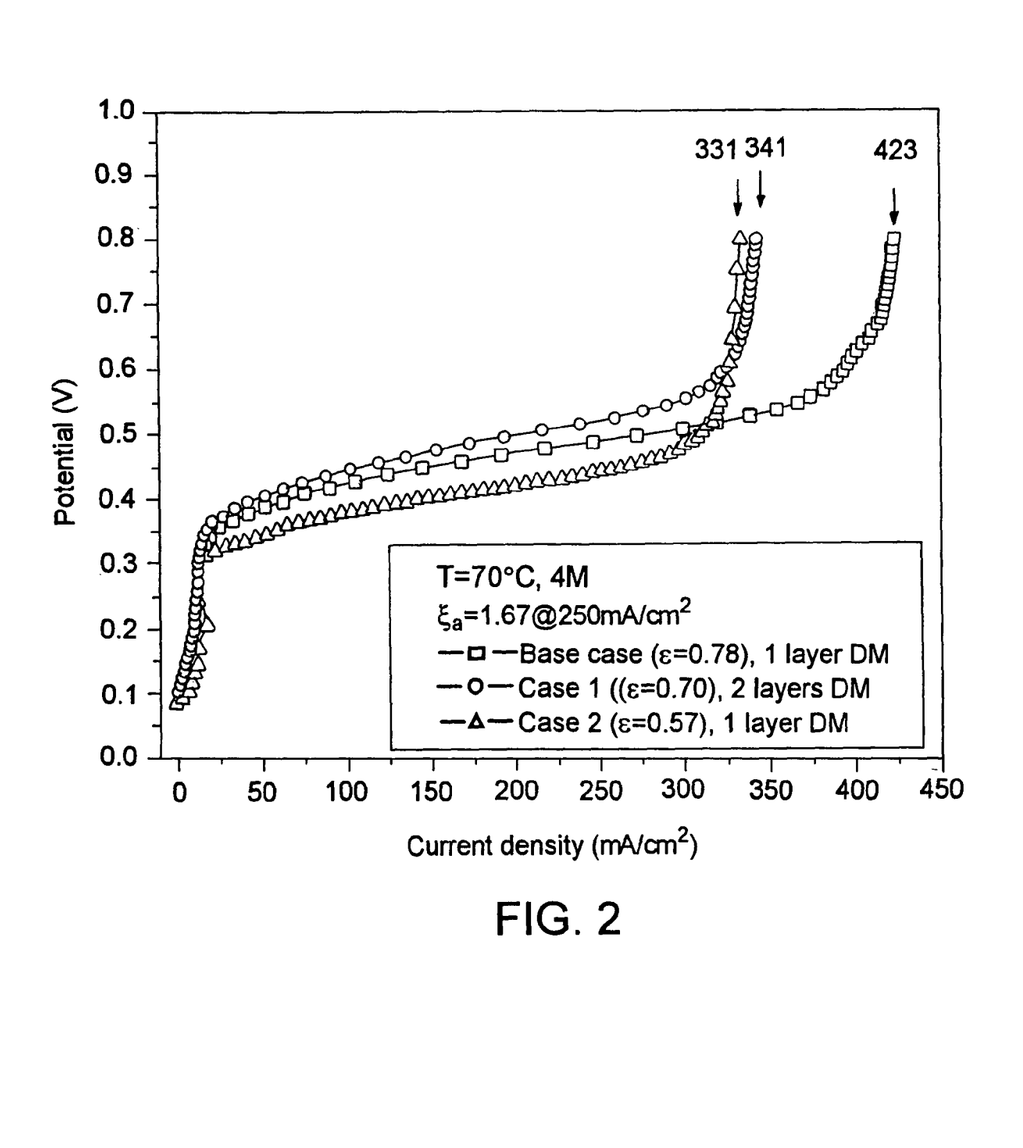
FIG. 2 is a graph showing methanol crossover under open-circuit condition of MEA with the base case and modified anode GDL when fed with 4M methanol.
Figure 3:
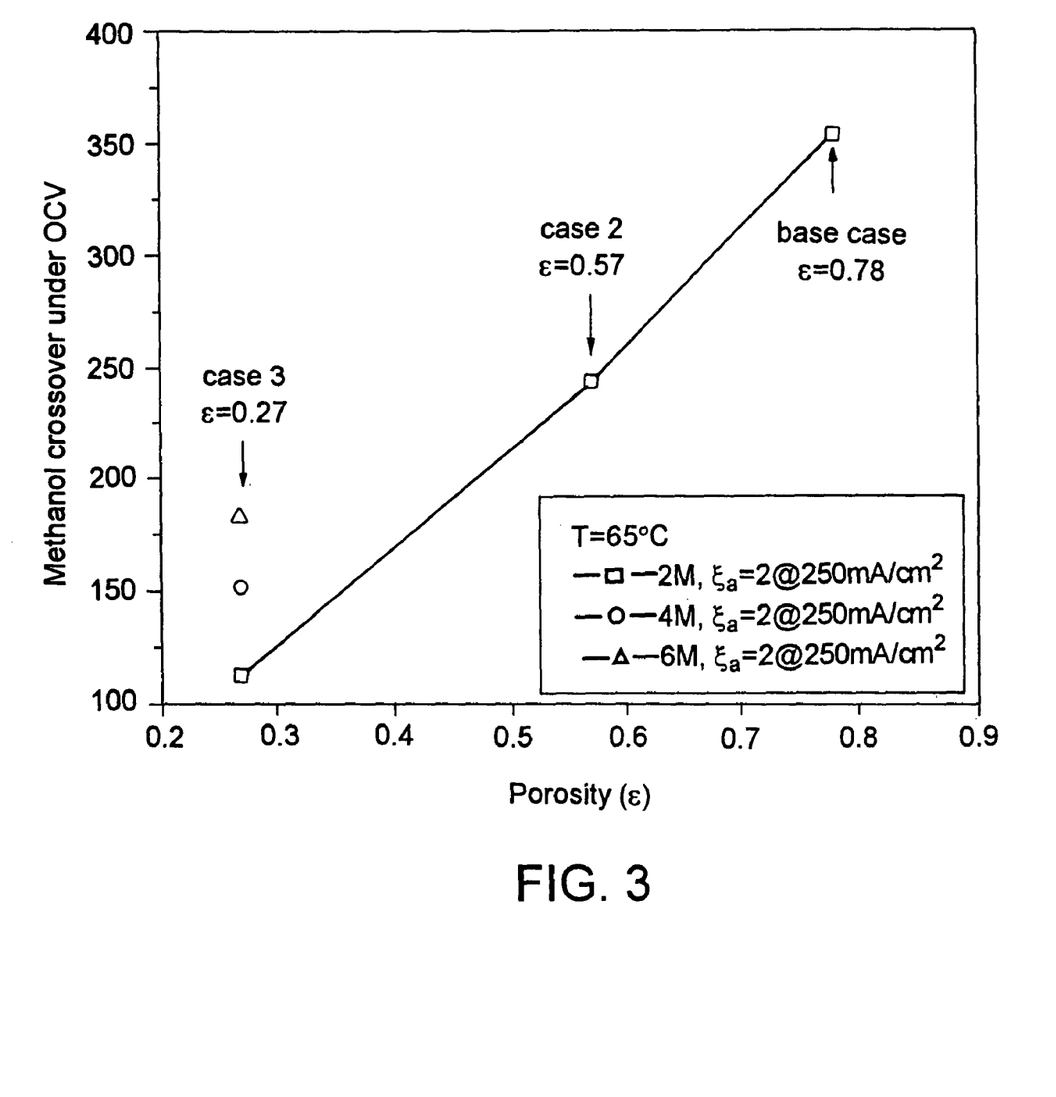
FIG. 3 is a graph showing methanol crossover under open-circuit condition of MEA at 65° C. as a function of porosity of anode GDL.

As illustrated in FIG. 2, which shows potential as a function of current density, a comparison with the results obtained with the base case GDL, (10 wt % wet-proofed Toray TGPH-90 carbon paper having a porosity of 0.78%), the MEA with the modified GDL (case 1 and case 2) shows 19% and 22% increase in current density in open-circuit condition when fed with 4 molar (M) methanol. This indicates that increasing thickness of the anode diffusion media (from one layer to two layers of Toray TGPH-90 carbon paper) and decreasing the porosity of the anode diffusion media (from 0.78% to 0.57%) can significantly reduce methanol crossover through the membrane. As shown in FIG. 3, methanol crossover decreases with decreasing of the porosity of anode GDL.

When the porosity of the anode diffusion media is extremely low, such as 0.27% in the case 3, the methanol crossover through the membrane under open-circuit condition is very small. When fed with 2M methanol, the methanol crossover under open-circuit condition in the case 3 is only 32% of that exhibited in the base case, and about half of that exhibited in the case 2 ($\epsilon$=0.57%). Even when fed with 6M, the methanol crossover under open-circuit condition in the case 3 is less than half of when fed with 2M in the base case. Therefore, low porosity anode diffusion media was found to be an effective method to reduce methanol crossover through the membrane.

Figure 4:
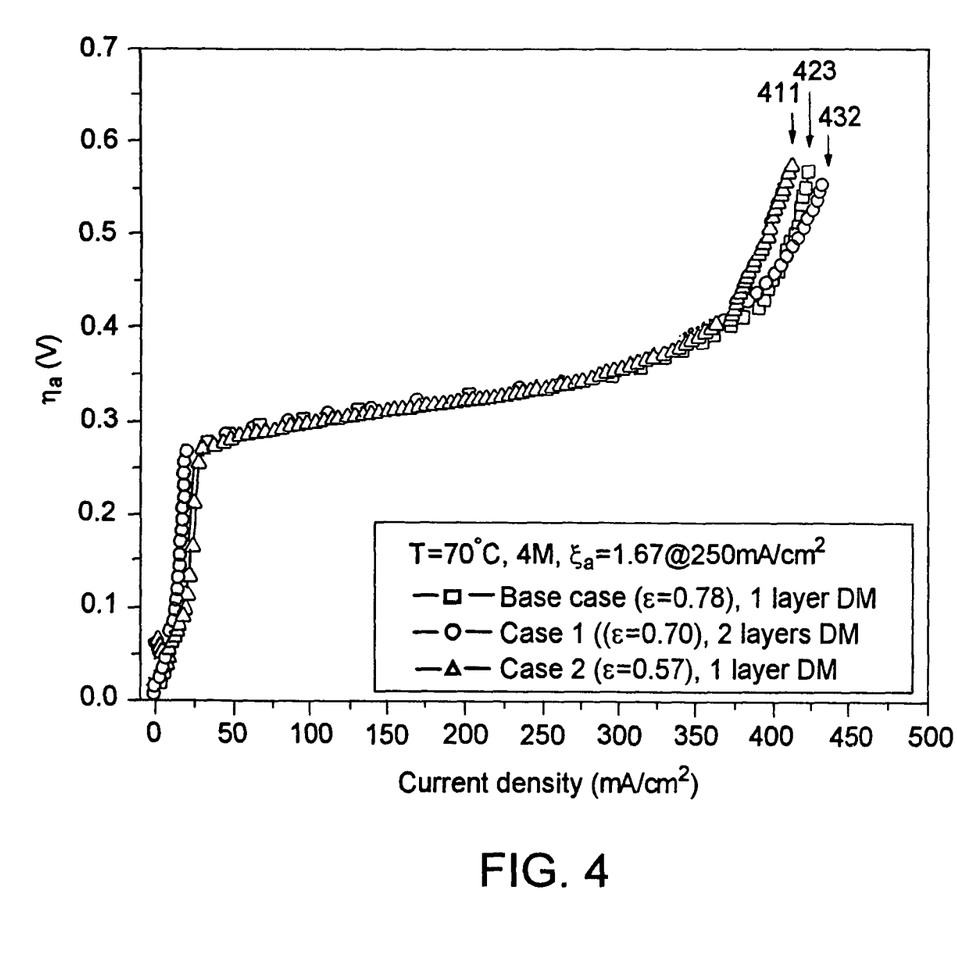
FIG. 4 is a graph of IR-free anode polarization as a function of current density with the base case and modified anode GDL when fed with 4M methanol.
Figure 5:
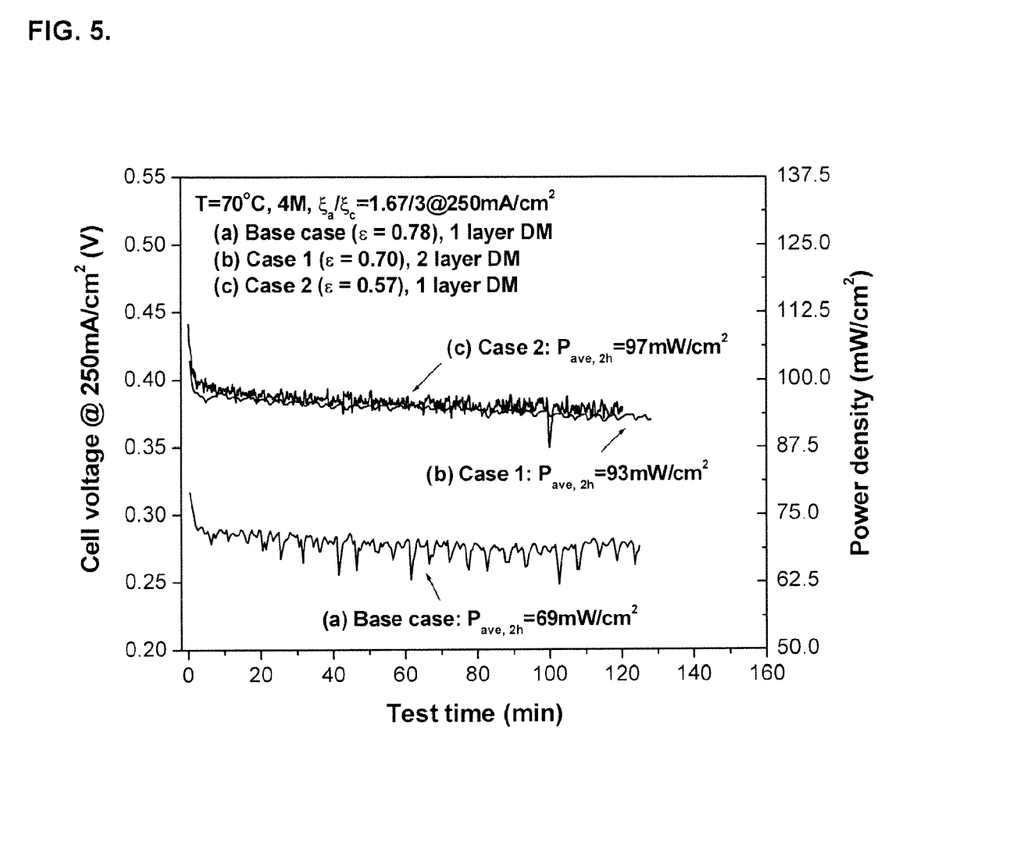
FIG. 5 is a graph showing Steady-state performance discharged at 250 mA/cm2 of DMFC with the base case and modified anode GDL when fed with 4M methanol.
Figure 6:
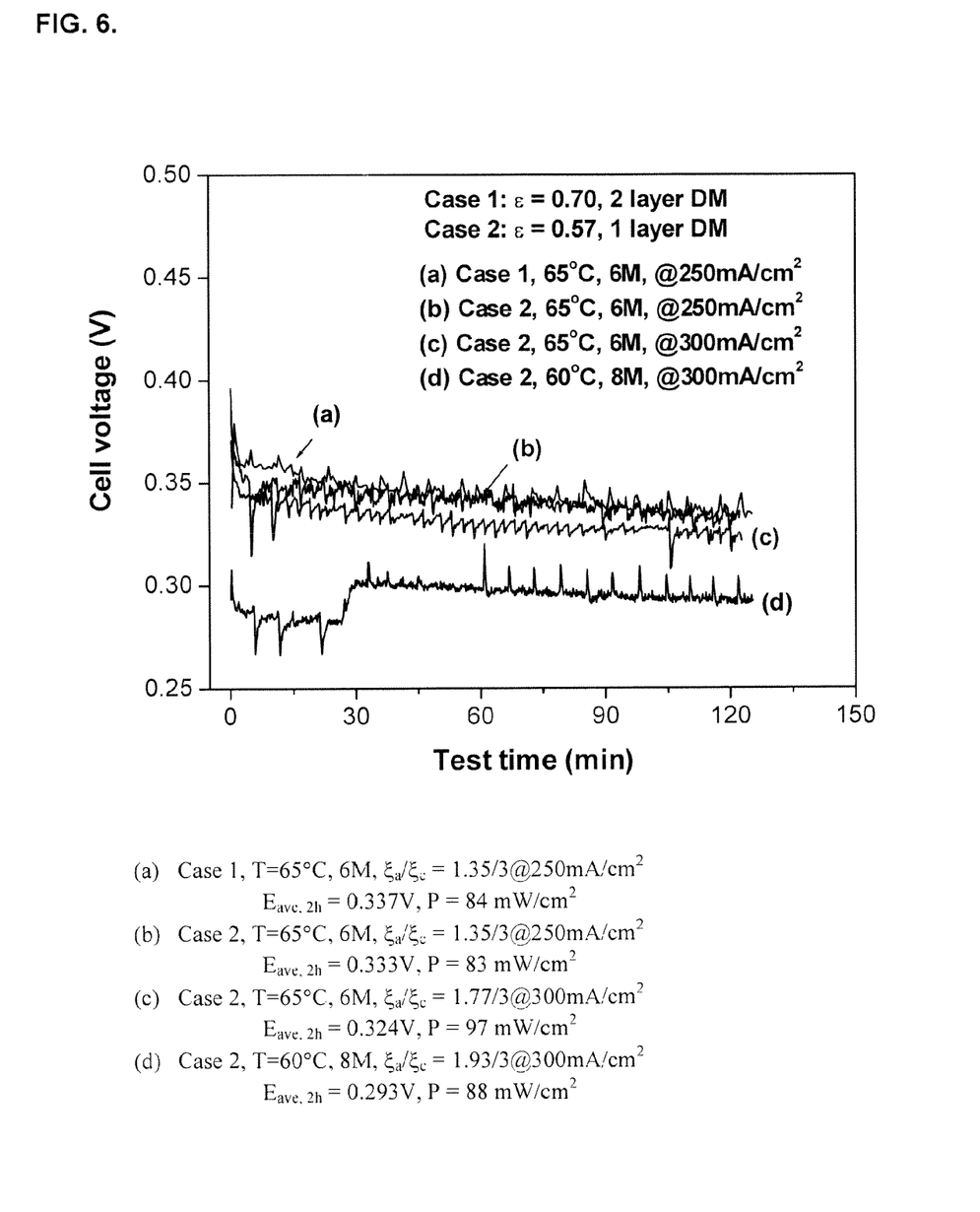
FIG. 6 is a graph showing Steady-state performance of DMFC with the modified anode GDL when fed with 6M and 8M methanol.

While fed with a fuel of 4M methanol, the IR-free anode overpotential in modified cases (case 1 and case 2) is almost the same as that in the base case (FIG. 4). Low methanol crossover in the modified cases (case 1 and case 2) increases fuel efficiency, and mitigates the effect of mixed potential at the cathode side. Therefore, there is a marked improvement in power density in case of MEA with the modified GDL's. As shown in FIG. 5, the power density of the modified cases (case 1 and case 2) can reach 93 to 97 mW/cm$^2$ at 70° C., which is about 35 to 40% higher than that achieved in the base case. In addition, DMFC with the modified GDL's (case 1 and case 2) can achieve high power even when fed with high concentration methanol fuel such as 6M and 8M methanol. As shown in FIG. 6, the power densities at 70° C. that can reach as high as 97 and 88 mW/cm$^2$ when fed with 6M and 8M methanol, respectively.

Figure 7:
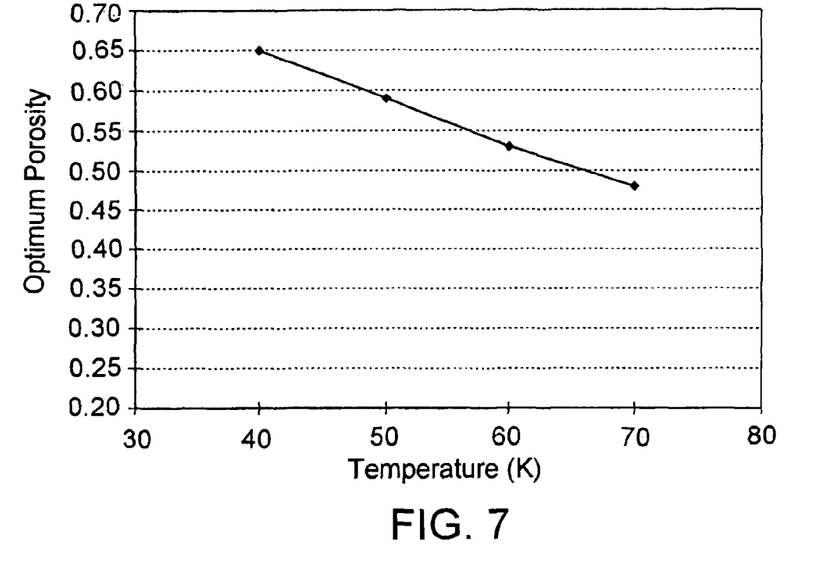
FIG. 7 is a graph showing optimal anode diffusion medium porosity is correlated with operating temperature.

As shown in FIG. 3 and described above, methanol crossover is decreased by decreasing the porosity of the anode GDL. When configuring the optimum porosity, methanol cross over and anode over potential may be considered. Lowering the porosity, reduces methanol cross over, because methanol permeability goes down. However, when the porosity decreases from a certain value, anode over potential goes up and cell performance goes down because the methanol supply is not sufficient in the anode catalyst layer. As shown in FIG. 7 the optimum porosity of the anode GDL is also a function of operating temperature. Therefore, optimum porosity may be dependent on operating temperature and current density. Once an operating condition is determined, optimum porosity may be determined by referencing FIGS. 7 and 8.

In one embodiment, the DOFC operating temperature is at least 50° C., preferably at least 70° C. As shown in FIG. 7, the corresponding porosity at 50° C. is about 0.59 and at 70° C. the corresponding porosity is about 0.48.

Figure 8:
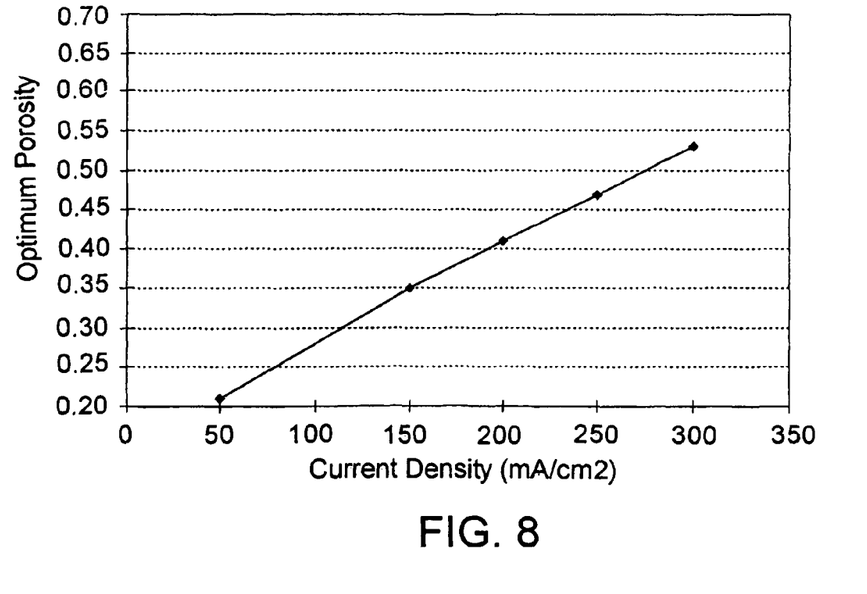
FIG. 8 is a graph showing optimal anode diffusion medium porosity is correlated with current density.

In addition, as shown in FIG. 8, the porosity of the anode GDL can also be reduced by decreasing the current density. In this manner, the optimum porosity can be achieved via adjustment of each of or some combination of the operating temperature, current density and FEP loading.

In another embodiment, the DOFC current density is less than 300 mA/cm$^2$, preferably is less than 200 mA/cm$^2$ and most preferably, less than 50 mA/cm$^2$. As shown in FIG. 8, the corresponding porosity at 300 mA/cm$^2$ is about 0.53 and the corresponding porosity at 200 mA/cm$^2$ is 0.41.

In summary, the present disclosure describes improved anode electrodes for use in DMFC systems via a reduction in porosity of the gas diffusion layer (GDL), which facilitates operation at good power densities with highly concentrated fuel.

In the previous description, numerous specific details are set forth, such as specific materials, structures, reactants, processes, etc., in order to provide a better understanding of the present disclosure. However, the present disclosure can be practiced without resorting to the details specifically set forth. In other instances, well-known processing materials and techniques have not been described in detail in order not to unnecessarily obscure the present disclosure.

Only the preferred embodiments of the present disclosure and but a few examples of its versatility are shown and described in the present disclosure. It is to be understood that the present disclosure is capable of use in various other combinations and environments and is susceptible of changes and/or modifications within the scope of the disclosed concept as expressed herein.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

What is claimed is:

1. A direct oxidation fuel cell (DOFC) comprising:
an anode electrode configured to generate power, the anode electrode having a gas diffusion layer (GDL) loaded with at least one polymer and a microporous layer;
wherein the GDL has a porosity such that it increases the power density of the DOFC,
wherein said porosity is adjusted by adjusting the polymer content of the GDL and,
wherein said porosity is selected based on at least one of the group consisting of:
operating temperature of the DOFC and
current density of the DOFC,
wherein, the DOFC is configured to have at least one selected from the group consisting of: an operating temperature of about 50° C. and porosity of about 0.59%; an operating temperature of 70° C. and porosity of about 0.48%; a current density of about 300 mA/cm$^2$ and porosity of about 0.53%; and a current density is 200 mA/cm$^2$ and porosity is about 0.41%,
wherein one of the at least one polymer is a fluorinated polymer, and
wherein the GDL is loaded at between 30 wt % to 70 wt % with the at least one fluorinated polymer.

2. The DOFC of claim 1 wherein one of the at least one fluorinated polymers is ethylene propylene.

3. The DOFC of claim 1, wherein the fuel cell further comprises a concentrated liquid fuel.

4. The DOFC of claim 3, wherein said concentrated liquid fuel is methanol.

5. The DOFC of claim 4, wherein said concentrated liquid methanol is at least 2 molar (M) concentration.

6. A method of making a direct oxidation fuel cell (DOFC) comprising:
configuring an anode electrode comprising a gas diffusion layer (GDL) and a microporous layer (MPL),
selecting at least one of:
a operating temperature of the DOFC and
a current density of the DOFC, and
adjusting the porosity of the GDL based on the operating temperature of the DOFC or the current density of the DOFC by adjusting a fluorinated polymer content of the GDL, to achieve a porosity of the GDL such that it increases the power density of the DOFC, wherein, the DOFC is configured to have at least one selected from the group consisting of: an operating temperature of about 50° C. and porosity of about 0.59%; an operating temperature of 70° C. and porosity of about 0.48%; a current density of about 300 mA/cm$^2$ and porosity of about 0.53%; and a current density is 200 mA/cm$^2$ and porosity is about 0.41%, and wherein said GDL is loaded at 30 wt % to 70 wt % with the at least one fluorinated polymer.

7. The method of claim 6, wherein one of the at least one fluorinated polymer is ethylene propylene.

8. The method of claim 6, wherein said GDL comprises carbon paper.

9. The method of claim 6, wherein said MPL is prepared from carbon powder and Polytetrafluorethylene (PTFE) suspension.

10. A method of operating a direct oxidation fuel cell (DMFC) system, comprising steps of:

(a) providing at least one fuel cell assembly including a cathode and an anode with an electrolyte positioned therebetween, said anode comprising a gas diffusion layer (GDL) including a microporous layer, said microporous layer comprising an electrically conductive material and a fluoropolymer, loading of said fluoropolymer in said microporous layer being in the range from about 30 to about 70 wt. %;

b) supplying a concentrated solution of a liquid fuel and water to said anode;

c) operating said at least one fuel cell assembly in at least one selected from the group consisting of: at a temperature of about 50° C. and porosity of about 0.59%;

at a temperature of 70° C. and porosity of about 0.48%; at a current density of about 300 mA/cm$^2$ and porosity of about 0.53%; and at a current density is 200 mA/cm$^2$ and porosity is about 0.41%.

* * * * *